Sept. 1, 1931.    G. D. JONES    1,821,646
POWER TRANSMITTING DEVICE
Filed July 28, 1930    2 Sheets-Sheet 1

Inventor:
Gwilym D. Jones,
By Wallace R Lane
Atty.

Sept. 1, 1931.  G. D. JONES  1,821,646
POWER TRANSMITTING DEVICE
Filed July 28, 1930   2 Sheets-Sheet 2
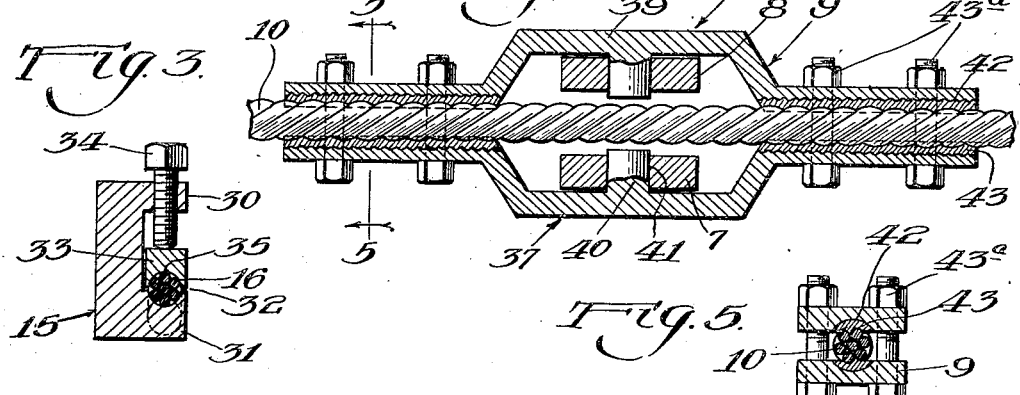
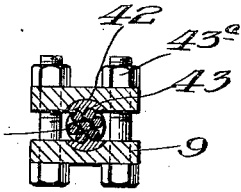
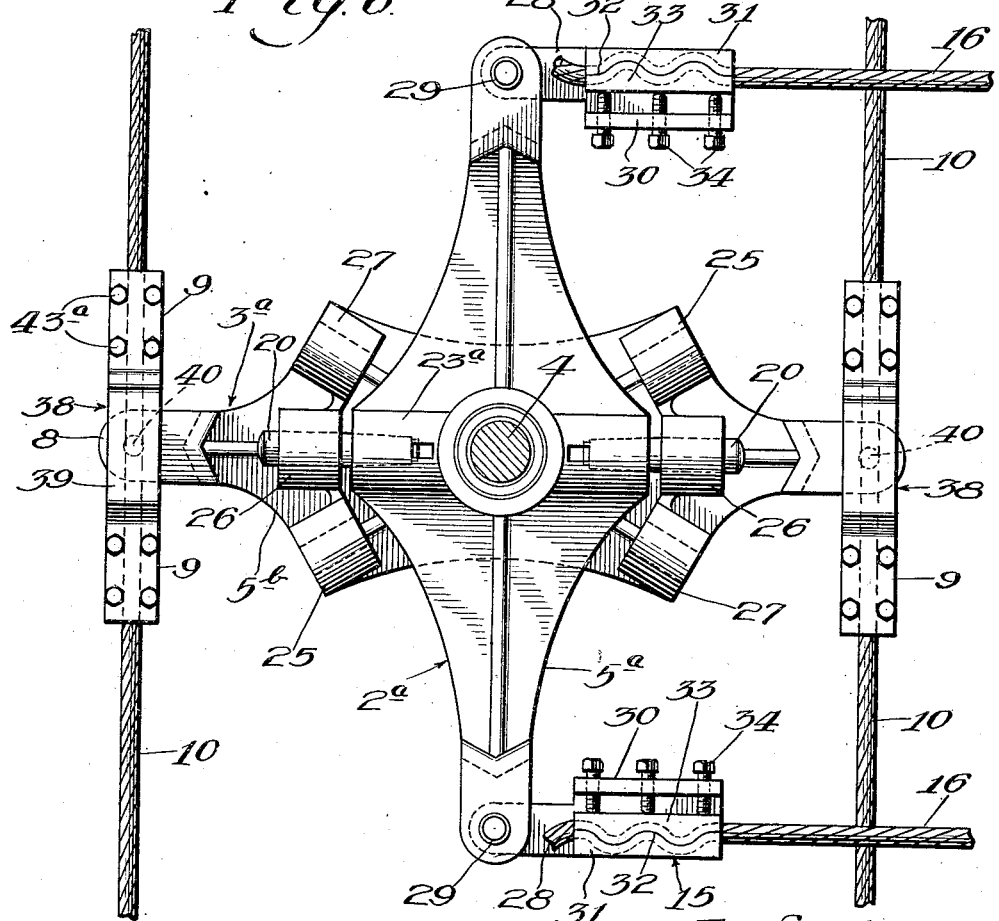
Inventor:
Gwilym D. Jones,
By Wallace R. Lane
Atty.

Patented Sept. 1, 1931

1,821,646

UNITED STATES PATENT OFFICE

GWILYM DAVID JONES, OF OAK CREEK, COLORADO, ASSIGNOR OF ONE-HALF TO BENJAMIN W. SNODGRASS, OF DENVER, COLORADO

POWER TRANSMITTING DEVICE

Application filed July 28, 1930. Serial No. 471,400.

The present invention relates to power transferring or transmitting means, or the like.

Among the objects of the present invention is to provide a novel mechanism for transmitting, transferring or imparting power and motion, through suitable connecting elements, such as cables or the like, to means to be operated thereby, such as a mining conveyor or the like, such mechanism being operated by power derived from a central source.

The present novel mechanism is particularly adapted for use in transmitting or transferring power for operating oscillating mining conveyors, such as those provided with a series of pans or flights and arranged with a series in a main passage, and auxiliary, with a series in a main passage, and auxiliary, branch or contributory series in branch or side passages or mine rooms, these branch series adapted to convey and deliver mined or other material to the main series, which in turn conveys or delivers the material to cars, or the like, for loading the same, this loading preferably taking place at the entrance or mouth of the main passage or entrance to the mine.

To provide separate and independent means for operating each of the plurality of series of conveyor units in the mine, would not only be inconvenient because of the lack of available space for the same, but it would likewise be impracticable and costly.

The present invention accordingly comprehends the avoidance of such difficulties, as likewise the idea of providing a single suitable source of power for operating the plurality of conveyor units, and to also provide novel means whereby such power or a part thereof may be transmitted or transferred in any desired direction relative to the main conveyor unit for operating the lateral or branch unit simultaneously with the main conveyor unit, and from the same source of power. Such means are positioned at the junction of the main unit and the lateral or branch units, the same being operatively connected together, as by means of flexible cables, or the like, which may be connected to the individual flights or pans thereof.

Another object of the invention is to provide a novel transmitting or transferring device comprising a plurality of movable members adapted to rotate about a jack shaft in a mine shoring construction, or the like, and to each of which members is secured power transmitting elements, these elements extending in various directions for operating conveyor units radiating therefrom, means being further provided whereby these members may be connected together in various angular relationship for simultaneous movement thereof, or disconnected for relative movement of these members, thereby effecting an operation of certain of the conveyor units operatively associated with certain of the members, while others are idle, without necessitating the disconnecting of any of the power transmitting elements with a movable member of the device.

In a specific embodiment illustrative of the invention, such a device comprises elongated members, each of which are provided with a central hub portion for mounting the same about a jack shaft or the like. In the drawings, these members are shown as being mounted or fulcrumed adjacent one another on a jack shaft in a mining structure, and at the junction point of conveyors extending radially therefrom and in various directions, these members having the power transmitting elements of the conveyor unit secured to their other end. One of the movable members is provided with one or more opposite and spaced projecting parts which are provided with an opening or bore and into which may be driven pins adapted to project into and engage aligned openings or bores provided in the other member, when it is desired to simultaneously move these members. Openings communicating with the bores of the member into which the pins project, are provided, whereby the same may be removed for effecting relative movement of the members for operating one of the conveyor units, while the other idles, or, if a change in the angular relation of the members is desired, the pins may be reinserted in other aligned openings of the members.

Another object of the invention is to provide a novel clamp device for pivotally securing the ends of a power transferring element operatively connecting one of the movable members with a branch or laterally extending conveyor unit, or the flights or pans thereof. In the illustrative embodiment of such clamp device, the same is shown as comprising an elongated body portion provided with an aperture for pivotally securing the same to the end of one of the movable members, this body portion having flanges, one of which is provided with an undulated or corrugated clamping surface, the entire surface or that portion gripping the power transmitting element of which is lined with a soft material, such as lead, bronze, alloys, or the like, whereby the element will not be injured upon a gripping of the same. A movable clamp element having a complementary surface correspondingly lined or covered with a soft material is provided between the flanges of the device, means being further provided in a flange of the body for movement of the clamp element and for gripping the power transmitting element therebetween and the clamp surface of the other flange. The undulated surfaces of the clamped device effect bends and kinks in the power transmitting element to prevent slipping of the same therein.

The invention further comprehends the idea of providing another novel clamp device adapted for use where kinking or bending of the power transmitting element is undesirable, as along the length of a power transmitting element for driving a main conveyor unit or the like. In an embodiment illustrative of such a novel device the same is shown as comprising clamp elements provided with an elongated body portion, each of which have a central offset part provided with a projection or a trunnion adapted to extend inwardly and engage in openings in the bifurcated end part of a movable member. The end portions of these elements are adapted to grip portions of a power transmitting element passing therethrough, these end portions, or a part thereof, being lined or covered with a soft material in order not to injure the power transmitting elements. Means are provided for securing the clamp elements together and for drawing the end portions thereof about the power transmitting element for gripping the same.

Other objects, features, capabilities and advantages are comprehended by the invention as will later appear, and as are inherently possessed thereby.

Referring to the drawings:

Fig. 3 is a transverse cross sectional view taken in a plane represented by the line 3—3 of Fig. 1 of the drawings, and disclosing the construction of a clamp device used in the present novel power transmitting device.

Fig. 4 is a longitudinal vertical cross sectional view taken in a plane represented by the line 4—4 of Fig. 1 of the drawings, and showing in detail the construction of another clamp device adapted for use in the present novel power transmitting device.

Fig. 5 is a transverse vertical cross sectional view taken in the plane represented by the line 5—5 of Fig. 4 of the drawings.

Fig. 6 is a top plan view of a further embodiment disclosing the present invention.

Figure 1:
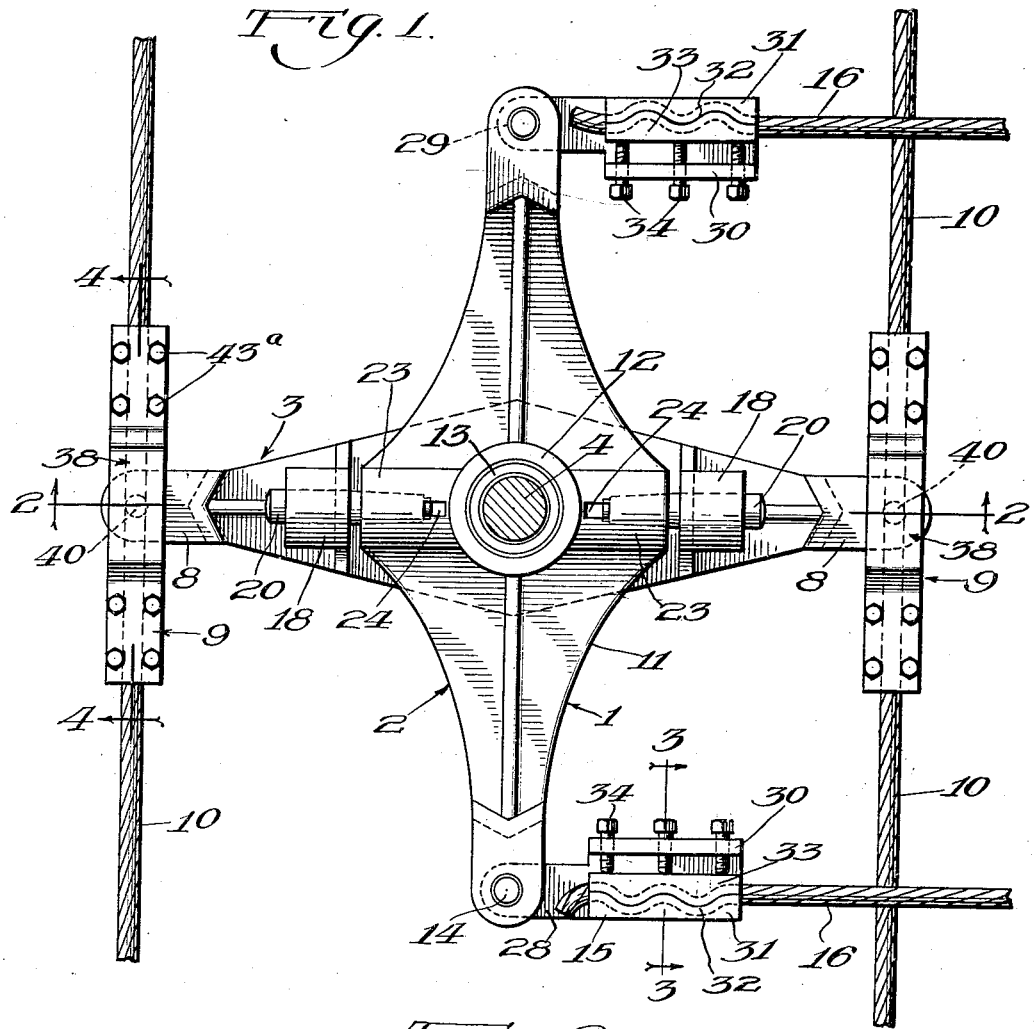
Fig. 1 is a top plan view of a power transmitting device constructed in accordance with the invention and showing the same fulcrumed about a shaft at a junction point where it is desired to direct power and movement occurring in one of the cables to another laterally disposed thereto.
Figure 2:
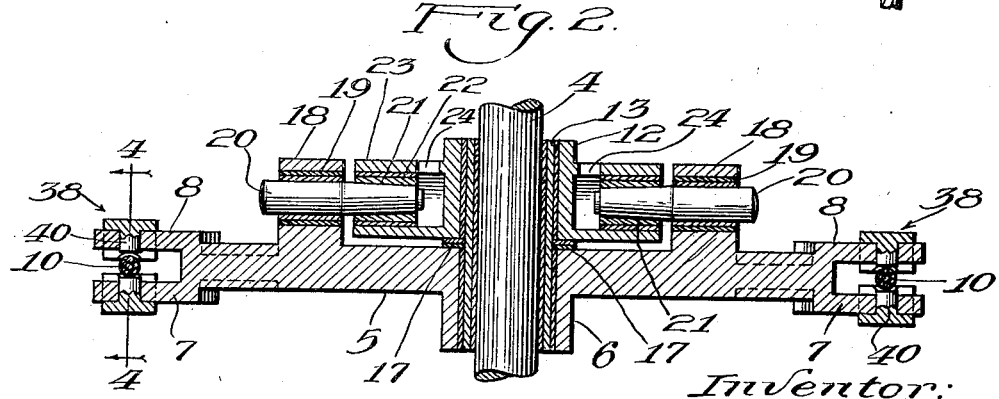
Fig. 2 is a vertical cross sectional view taken in a plane represented by line 2—2 of Fig. 1 of the drawings.

Referring now more in detail to the drawings, an embodiment selected to disclose the invention is shown in Fig. 1 as comprising a double bell crank 1 comprising two movable members 2 and 3 which are mounted on and fulcrumed about a shaft of a jack for shoring constructions placed at the junction point of a mine shaft or passage and a laterally extending or branch shaft or passage, these two movable members 2 and 3 being adapted to be connected together whereby the same may be simultaneously moved, for purposes to be later more fully disclosed. The movable member 3 comprises an elongated body portion 5 having a central hub portion 6 for mounting the same upon the shaft or jack 4 of the shoring construction. The ends of the body portion 5 are bifurcated to provide bifurcated parts 7 and 8 adapted to pivotally support clamping devices 9, which clamping devices 9 are adapted to grip a cable 10. This cable 10 is connected with a central source of power which is preferably located at the entrance of the mine passage in which these cables operate, the mechanism at the central source of power to which this cable 10 is connected, producing a reciprocative jerking movement to the cable 10, such movement being transmitted to a conveyor unit or the pans or flights of the same to which the cable 10 is connected.

The movable member 2 of the present construction is of somewhat similar construction as the movable member 3 and is provided with an elongated body portion 11 having a central flanged hub part 12 adapted to fit over a bushing 13, which bushing extends downwardly to provide suitable bearing means for the hub 6 of the lower movable member 3.

The outer ends of the movable member 2 are bifurcated as are the ends of the movable member 3 and are provided with aligned openings, a bolt or pin 14 adapted to pass through the same and an opening in a clamp device 15, (to be later more fully disclosed) for securing this clamp device thereto, these clamp devices gripping the ends of a cable 16 adapted to extend along and be connected to a conveyor or the pans or flights thereof in a branch or lateral mine passage extending away from the shaft 4 and the mine passage in which the same is located.

Each of these movable members 2 and 3 of the power transmitting device are mounted adjacent one another and upon the bushing 13, washers 17 being provided between these members for separating the same. In order that the movable member 2, which is operatively connected by way of the cable 16 to the laterally extending conveyor units, may be moved by the movable member 3, which is moved and operated by way of the cable 10 connected with suitable mechanism operated from the central source of power, means are provided for connecting these two members together. Projecting portions or parts 18 are provided adjacent the end portions of the body 5 of the movable member 3, which are adapted to project upwardly and adjacent the side portions of the movable member 2. These projecting parts 18 are provided with a bore or an elongated opening therethrough in which is fitted a bushing 19 into which pins 20 may fit, these pins having a tapering projecting part 21 adapted to project into and be received by a bushing 22 fitting within a bore or an elongated opening in the sides 23 of the member 2. These pins may be inserted into the bore of the projecting parts 18 and be driven into the bushing 22 in the movable member 2 whereby the same may be made to move upon movement of the movable member 3. It can readily be seen that when these members are connected by way of the pins for simultaneous movement, that the lineal movement of the cable 10 is transferred or transmitted to the member 2, which in turn imparts such motion in a lineal direction laterally to that in the cable 10. The lateral or branch conveyor units operatively connected with the cable 16 are accordingly simultaneously moved with the conveyors attached or connected with the cable 10 and move the mined material toward the conveyor unit to which the cables 10 are connected, which material when received by the same progressively moves toward the entrance to the main mine passage, at which point the same is loaded upon cars and disposed of.

Whenever it be desired to move the conveyor, to which the cables 10 are connected, independently of the conveyor unit to which the cables 16 are connected, these pins 20 may be removed which disengages the members 2 and 3, at which time the movable member 3 will move relative to the movable member 2 which will remain idle. The pins 20 are easily removed by the insertion of a rod or other tool through the opening 24 communicating with the bore in the sides 23 of the member 2, which rod or tool may wedge or force the pin or pins 20 outwardly. The present novel arrangement provides a device in which the laterally extending cables may remain idle, while those in the main passage may continuously move without the necessity of disengaging the same from any mechanism of the device.

In Fig. 6 of the drawings, another embodiment is shown for disclosing the present novel invention, the power transmitting device thereof, as in the previously described embodiment, comprising two movable members $2^a$ and $3^a$ similarly mounted adjacent one another and upon a jack shaft or the like 4 at the junction of mine passages. The movable member $2^a$ is of similar construction as the movable member 2 of the previously described power transmitting device, and is provided with an elongated body portion $5^a$ having side portions $23^a$ provided with a bore or elongated opening for receiving the projecting parts of a pin 20, as provided in the power transmitting device of Fig. 1 of the drawings. The outer ends of the member $2^a$ are bifurcated and pivotally support the clamp devices 15 which grip the ends of the cable or power transmitting element 16.

The movable member $3^a$ of the present embodiment is of similar construction to the movable member $3^a$ of the power transmitting device of Fig. 1 of the drawings, the same being provided with an elongated body portion $5^b$, the outer ends of which are bifurcated for pivotally supporting the clamp devices 9 for gripping the cables 10 and for transferring movement thereof, through the pin connections, to the movable member $2^a$ and cable 16. This movable member $3^a$, however, is provided with a plurality of projecting parts 25, 26 and 27 spaced apart adjacent the end portion of the body portion $5^b$ of the member and project upwardly adjacent the sides $23^a$ of the movable member $2^a$.

Each of these projecting parts are provided with a bore or an elongated opening therein adapted to receive a pin 20 for connecting and movement of the movable member $2^a$ with the movable member $3^a$. In Fig. 6 of the drawings, the pins 20 are shown as being inserted in the aligned projecting parts 26 of the movable member $3^a$ for engaging the elongated openings in the side portions of the movable member $2^a$ whereby the same is at right angles to the member $3^a$ for movement of the cable 16 in a mine passage at right angles to that in which the cable 10 is operated. If, however, the mine passage in which the cable 16 operates is at an angle greater or less than a right angle with that in which the cable 10 operates, the pin 20 may be removed from the opening in the projecting part 26 and be inserted in either of the openings in the projecting parts 25 and 27 whereby the angular relationship between the members is varied, and the cable 16 is properly aligned within the mine passage radiating from the junction point of the jack shaft 4. As previously described, the pins 20 may be removed so as to disengage the movable member 2ª from the movable member 3ª whereby the cable 16 may remain idle irrespective of the movement of the cable 10 and movable member 3ª.

As hereinbefore disclosed, the clamp devices 15 are provided for gripping the ends of the power transmitting element 16 and for operatively connecting the same to a movable member of a power transmitting device.

This clamp device comprises an elongated body portion 28 having an aperture or opening 29 adjacent one end thereof, this end portion adapted to be received between the bifurcated end portions of either of the movable members 2 or 2ª, the opening 29 adapted to be aligned with the openings of the bifurcated end portions, through which aligned openings a pin, such as 14, is adapted to extend for pivotally securing the clamp device thereto. The other end of the body portion 28 of the clamp device is provided with laterally extending flanges 30 and 31, the flange 31 being provided with an undulated clamp surface 32 for gripping the cable 16 in a manner to be more fully explained. A movable clamp element 33 having a complementary undulating clamp surface similar to that of the flange 31 is provided between the flanges of this device, and is adapted to grip the cable 16. Set screws 34 are provided in the flange 30, and are adapted to contact with the movable clamp element 33 for movement of the same toward the flange 31 and for gripping and securing the end of the cables therebetween. A longitudinal groove 35 is provided in each of the clamp surfaces of the clamp element 33 and flange 31, these grooves being adapted to fit about the cable 16. These elongated grooves of the device may have a lining or covering of some suitable soft material, such as lead, bronze, alloys or the like so as to prevent injury to the cables which are gripped by the same. It will be seen that by providing an undulating or wavy surface to the clamp elements of the present device, that the ends of the cables secured therein are bent or kinked, these bends or kinks in the cable preventing the slipping of the same in the clamp device.

The clamp device 15 has been shown as being used and adapted for use in the present invention for securing the ends of a cable with the present power transmitting device, which end or ends of the cable were bent or provided with kinks by the undulated or wavy surfaces of the clamp elements of the clamp device. Where, however, it is desired to secure an intermediate part of a cable, such as the cable 10, to the power transmitting device, a clamp element 9, previously referred to, is preferably used. This clamp device comprises clamp elements 37 and 38 having an elongated body portion, the central part 39 of each being bent or offset and provided with a projecting part or trunnion 40 adapted to extend inwardly and engage in suitable apertures or openings 41 provided in the bifurcated end portions 7 and 8 of either of the members 3 and 3ª, for pivotally supporting this clamp device on the end thereof. The outer ends of each of the clamped elements 37 and 38 are provided with an elongated groove portion 42 provided with a lining or covering 43 of some soft material, such as lead, bronze, alloys or the like, for preventing injury to the cable 10 when the clamp device is secured thereto. The clamp elements 37 and 38 are connected and drawn together for gripping the cable 10 by way of bolts 43ª passing through aligned openings in the end portions of these clamp elements. It will be noted that no bends or kinks are provided in the cable 10 by the connection provided by this clamp device.

While I have herein described and upon the drawings shown illustrative embodiments of the invention, it is to be understood that the invention is not limited thereto, but may comprehend other constructions, arrangements of parts, details and features without departing from the spirit of the invention.

Having thus disclosed the invention, I claim:

1. A power transmitting device, comprising movable members fulcrumed adjacent on a shaft and having power transmitting elements secured thereto, and means for connecting said members together in different angular relations for simultaneous movement of said elements in various directions.

2. A power transmitting device, comprising movable members fulcrumed adjacent on a shaft and having power transmitting elements secured thereto, one of said members provided with projecting parts and having openings therein, the other of said members provided with openings, and pins for engaging in aligned openings of said members for connecting said members together in different angular relation for movement of said elements in various directions.

3. A power transmitting device, comprising movable members fulcrumed adjacent on a shaft, clamp devices pivotally secured to said members for gripping and movement of power transmitting elements, one of said members provided with projecting parts and having openings therein, the other of said members provided with openings, and pins for engaging in aligned openings of said members for connecting said members together in different angular relation for movement of said elements in various directions.

In witness whereof, I hereunto subscribe my name to this specification.

GWILYM DAVID JONES.